United States Patent [19]
Baek et al.

[11] Patent Number: 5,990,026
[45] Date of Patent: Nov. 23, 1999

[54] METHOD OF PRODUCING A SURFACE MODIFIED SIALON COMPOSITE

[75] Inventors: Yong Kee Baek; Suk-Joong L. Kang; Sung Min Lee; Seung Su Baek, all of Daejon, Rep. of Korea

[73] Assignee: Agency for Defense Development, Daejon, Rep. of Korea

[21] Appl. No.: 09/039,094

[22] Filed: Mar. 13, 1998

[30] Foreign Application Priority Data

Mar. 15, 1997 [KR] Rep. of Korea .......................... 97/8870

[51] Int. Cl.$^6$ .................................................. C04B 35/599
[52] U.S. Cl. ........................ 501/98.1; 501/98.2; 501/98.3; 264/666; 264/673
[58] Field of Search ................................... 501/98.1, 98.2, 501/98.3; 264/673, 666

[56] References Cited

U.S. PATENT DOCUMENTS

| | | | |
|---|---|---|---|
| 4,880,755 | 11/1989 | Mehrotra et al. | 501/98.1 |
| 5,081,079 | 1/1992 | Ukyo et al. | 501/98.1 |
| 5,120,682 | 6/1992 | Ukyo et al. | 501/98.2 |
| 5,275,986 | 1/1994 | Yamamoto et al. | 501/98.1 |
| 5,316,856 | 5/1994 | Suzuki et al. | 501/98.3 |
| 5,352,395 | 10/1994 | Kallenbach et al. | 264/673 |
| 5,411,923 | 5/1995 | Suzuki et al. | 501/98.3 |

*Primary Examiner*—Karl Group
*Attorney, Agent, or Firm*—Darby & Darby

[57] ABSTRACT

A sialon composite and fabrication method thereof in which the phase of a surface layer thereof is modified differently from that of the bulk. The surface layer is modified to α-sialon or α–β sialon composite but the bulk is β-sialon. Also, the surface layer is modified to β-sialon or α–β sialon composite but the bulk is α-sialon.

16 Claims, 1 Drawing Sheet

METHOD OF PRODUCING A SURFACE MODIFIED SIALON COMPOSITE

BACKGROUND OF THE INVENTION

1. Field of the Invention

The present invention relates to the surface modification of sialon ceramics and surface modified sialon ceramics prepared thereby, wherein the phase of the surface layer in sialon ceramics has the different phase from the bulk phases.

2. Description of Prior Art $Si_3N_4$ has two different structural modifications, $\alpha$ and $\beta$. The solid solution in $\beta\text{-}Si_3N_4$, formed by simultaneous equivalent substitution of Al—O for Si—N called $\beta$-sialon and the solid solution in $\alpha\text{-}Si_3N_4$ called a-sialon.

The general mechanical and thermal properties of sialon ceramics are summarized at Table. 1.

TABLE 1

The General property comparison of $\alpha$- and $\beta$-sialon ceramics

| Properties | $\alpha$-sialon | $\beta$-sialon |
|---|---|---|
| Hardness (Hv, kg/mm$^2$) | ~2000 | ~1500 |
| Strength (MPa) | 300~400 | 500~900 |
| Fracture Toughness (MPam$^{1/2}$) | 3~5 | 4~10 |
| Thermal Oxidation Resistance | excellent | good |

The general formula of $\beta$-sialon is, $Si_{6-z}Al_zO_zN_{8-z}$ where z varies 0 to 4.2 within solubility range.

The general formula of $\alpha$-sialon is $M_pSi_{12-(m+n)}A_{(m+n)}O_nN_{16-n}$, where p, m and n are variable numbers. M denotes metal ion where, Li, Mg, Ca, Y, Er, Nd, Gd, Dy, Na, Ce, Sm, and Be. In a case of M=Y, Y-$\alpha$-sialon(yttrium stabilized alpha sialon), m value varies 1.0 to 2.4 and n varies zero to 1.7 in relation to p-m/3.

In order to fabricate sialon ceramics, additives are usually used such as AlN, $Al_2O_3$, $Y_2O_3$, MgO, CaO, $Li_2O_3$, $Sm_2O_3$, $Er_2O_3$, $Yb_2O_3$, $Dy_2O_3$, $Gd_2O_3$, wherein positive metal ion penetrate into a network structure of $Si_3N_4$ for forming $\alpha$-sialon.

Sialon ceramics can be obtained from the powder mixtures of AlN, $Al_2O_3$, $Y_2O_3$, $Si_3N_4$, and the amounts of each powder determine the phase ratio of the $\alpha$- and $\beta$-phase.

In general, the microstructure of $\alpha$-sialon ceramics shows the equiaxed grains with high hardness, better wear and oxidation resistance, while $\beta$-sialon ceramics by their elongated grains with better flexural strength and fracture toughness. To combine advantages in physical properties of both sialons, $\beta$–$\beta$ sialon composite has long been studied. For example, comparing with pure $\beta$-sialon, $\alpha$–$\beta$ sialon composite shows improved hardness and oxidation resistance with reduction of flexural strength and fracture toughness. These properties vary almost linearly with the formation of added sialon.

The surface modification is another technique to improve the properties of ceramics. The surface modification provides opportunities of introducing surface compressive stresses which result from the difference in thermal expansion coefficient between a surface layer and bulk. Some previous results showed that the surface nitridation of dense SiC could improve surface-sensitive mechanical properties because of the thermally induced compressive stresses at the surface of sialon ceramics.

SUMMARY OF THE INVENTION

Accordingly, it is a first object of the present invention to provide a surface modified sialon composite for selectively improving the properties thereof by simply changing a phase of the surface.

It is a second object of the present invention to provide a surface modified sialon composite wherein a second phase which is different from an internal phase thereof exists within several hundred $\mu$m in the sample surface.

It is a third object of the present invention to provide the surface modified sialon composite control method, wherein the surface layer phase in the $\beta$-sialon is variably controlled to range from $\alpha$-sialon to $\alpha$–$\beta$ sialon composite.

It is a fourth object of the present invention to provide the surface-modifying method of sialon composite, wherein the phase of the surface layer in the $\alpha$-sialon is variably controlled to the range from an $\alpha$-sialon to $\alpha$–$\beta$-sialon composite.

To achieve the above-described objects, there is provided the sialon composite according to the present invention, wherein the phase of the surface layer thereof is formed differently from that of an inner material beneath the surface layer.

BRIEF DESCRIPTION OF THE DRAWINGS

The present invention will become more clearly understood with reference to the accompanying drawings which are given only by way of illustration and thus are not limitative of the present invention, wherein.

DETAILED DESCRIPTION OF THE INVENTION

Figure 1A:
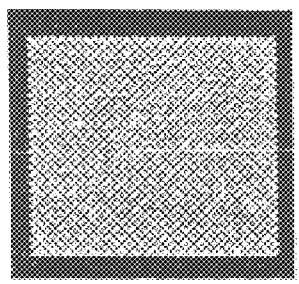
FIG. 1A is a schematic diagram of surface modified $\beta$-sialon, the surface of which is $\alpha$-sialon but the bulk is $\alpha$-sialon.
Figure 1B:
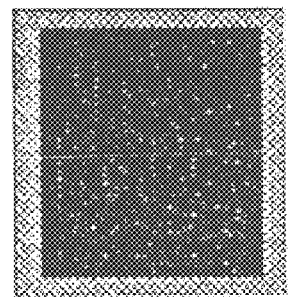
FIG. 1B is a schematic diagram of surface modified $\beta$-sialon, the surface is $\beta$-sialon but the bulk is $\alpha$-sialon.

As shown in FIGS. 1A and 1B, sialon ceramics made by this invention has surface-modified structure, wherein a phase of the surface layer is different from that of the bulk. The modification depth of sialon composite could be up to several hundred $\mu$m in the bulk.

As an example, sialon composite which has $\alpha$-sialon-surface layer but the bulk is $\beta$-sialon could be made in the present invention. As another example, the surface modification depth in the bulk could be precisely controled up to several hundred $\mu$m.

The surface modified $\beta$-sialon whose surface layer is modified into $\alpha$-sialon or $\alpha$–$\beta$ sialon composite shows an improvement in a surface hardness and oxidation resistance when compared to the 1-sialon ceramics which is not modified, whereas the fracture strength and toughness themselves remain unchanged, for thereby being advantageously applied to a high temperature strength as parts thereof which require a wearing resistance and oxidation resistance.

Also, the surface modified $\alpha$-sialon whose surface layer is modified into $\beta$-sialon of $\alpha$–$\beta$ sialon composite shows an increased surface strength and toughness when compared to the $\alpha$-sialon ceramics which is not modified, for thereby being employed at a relatively low temperature as parts thereof.

The surface modified sialon ceramics according to the present invention is obtained by sintering the sialon compact packed with the powder mixture for modifying the surface layer of the bulk compact.

When required in the present invention, a preheat treatment could be carried out, prior to sintering, at a temperature ranging from 1100° C.~1700° C. which is lower than that of the sintering temperature. Likewise, by changing the heat treatment conditions, the thickness of the modified surface layer can be easily adjusted.

As an example of the present invention, the fabrication method of the surface modified β-sialon whose surface is α-sialon of α–β sialon will now be described.

β-sialon compact according to the 1-sialon formula of $Si_{6-z}Al_zO_zN_{8-z}$ is made by die-pressing and/or cold isostatic pressing. In order to enhance the densification of the compact, sintering additives could be added such as $Y_2O_3$, $Al_2O_3$, AlN, $CeO_2$, $Nd2O_3$, $SM_2O_3$, $Er_2O_3$, $Yb_2O_3$, $Dy_2O_3$, and $Gd_2O_3$.

The compact of 1-sialon composition is packed by the powder mixture according to α-sialon formula of $M_pSi_{12-(m+n)}Al_{(m+n)}O_nN_{16-n}$ and then sintered at temperatures ranging from 1400° C.~1900° C. for a few minutes through several hours under nitrogen atmosphere. At this time in order to adjust the modification thickness of the surface layer, the preheat treatment can be carried out. for instance, at temperatures ranging from 1400° C. through 1700° C. for several hours, if required, prior to sintering. That is, when the β-sialon compact of $83.0Si_3N_4$-$12.1Al_2O_3$-$4.1AlN$ and $5-Y_2O_3$ in wt %, packed with the powder mixture of α-sialon composition is sintered at a temperature of 1750° C. without preheat treatment, the thickness of surface modification is about 50 μm; whereas the thickness of surface modification is about 200 μm when a three hours of the preheat treatment is applied at 1600° C. prior to one-hour sintering at a temperature of 1750° C.

The composition of β-sialon formula of $Si_{6-z}Al_zO_zN_{8-z}$ and sintering additives that can be added for fabricating the β-sialon are not confined by any means, nor is the composition of $M_pSi_{12-(m+n)}Al_{(m+n)}O_nN_{16-n}$ for forming the α-sialon surface layer on the β-sialon. By differentiating the values of p, m and n in the formula, the composition of the modified surface on the β-sialon can be varied to α-sialon or α–β sialon composite, wherein a desirable composition is m=1, n=1.7, p=m/3 where M is yttrium.

As another example of the fabrication method according to the present invention, the fabrication method of the surface modified α-sialon whose surface is β-sialon or α–β sialon, will now be explained.

α-sialon compact according to the α-sialon formula of $M_pSi_{12-(m+n)}Al_{(m+n)}O_nN_{16-n}$ is made by die-pressing and/or cold isostatic pressing. At this time, in order to enhance the densification of the compact, sintering additives could be added.

This α-sialon compact is packed by the powder mixture according to β-sialon formula of $Si_{6-z}Al_zO_zN_{8-z}$ and then sintered at temperatures ranging 1600° C.~1900° C. for several hours under a nitrogen or nitride atmosphere. At this time, in order to adjust the thickness of the surface layer, the preheat treatment can be carried out, for instance, at temperatures ranging from 1400~1700° C. which is lower than the sintering temperature, for several hours prior to the sintering, if required. Here, when there is no preheat treatment prior to sintering, the thickness of the β-sialon layer on α-sialon is about 50 μm and when the preheat treatment be applied prior to sintering, the thickness of the β-sialon surface layer is formed up to 200 μm.

The present invention will be further described with reference to the following examples, and the scope of the invention is not limitative thereto.

EXAMPLE 1

For the preparation of β-sialon compact, $Si_3N_4$, $Al_2O_3$, and AlN powders were weighed to balance on z=1 in the formula of $Si_{6-z}Al_zO_zN_{8-z}$ and the 5 wt % of $Y_2O_3$ was added as a sintering additive. After mixing and drying, the mixture were sieved with a 80-mesh sieve. Then the compact made by cold isostatic pressing at 200 MPa.

For the preparation of the packing powder of α-sialon composition which will modifies the β-sialon compact, $Si_3N_4$, $Al_2O_3$, AlN and $Y_2O_3$ powers were weighed to balance on M=yttrium, p=m/3, m=1 and n=1.7 in the formula of $M_pSi_{12-(m+n)}Al_{(m+n)}O_nN_{16-n}$. After mixing and drying, the mixture were sieved with a 80-mesh sieve.

The β-sialon compact was packed by α-sialon powder at a graphite crucible and sintered at 1750° C. under nitrogen atmosphere for one hour.

According to X-ray diffraction analysis, the surface of this specimen was α-sialon but inner part of it was β-sialon. The thickness of α-sialon layer was about μm by the result of the observation with Scanning Electron Microscope.

EXAMPLE 2

For the influence of the compositional change of β-sialon compact, Z values were varied from Z=0 to 1.5 as in the table 2. The sample were fabricated by same method as in Example 1. The compositional changes of surace layer on β-sialon were shown in Table 2:

TABLE 2

| The phase content ratio of surface layer with composition of β-sialon compact | | |
|---|---|---|
| Composition of β-sialon compact | The phase contents of modified surface layer | |
| z = 0 | α:30% | β:70% |
| z = 0.5 | α:70% | β:30% |
| z = 1.0 | α:100% | β:0% |
| z = 1.5 | α:30% | β:30% 12H(40%) |

EXAMPLE 3

In the formula of $M_pSi_{12-(m+n)}Al_{(m+n)}O_nN_{16-n}$, each of $Si_3N_4$, $Al_4O_3$, AlN and $Y_2O_3$ powder was weighed for α-sialon compact so as to satisfy M=Yttrium, p=m/3, m=1 and n=1.7 This powder mixture was mixed, dried and sieved, then made a compact by Cold Isostatic Pressing at 200 MPa.

For the preparation of packing power of B-sialon composition (Wherein, z=2), each powder of $Si_3N_4$, $Al_4O_3$, AlN was weighed and 5 wt % of $Y_2O_3$ was added. This powder batch was mixed, dried and sieved with a 80-mesh sieve. The α sialon compact packd by β-sialon powder was sintered at 1800° C. for two hours under nitrogen atmosphere.

As a result of X-ray diffraction of this specimen, the surface was β-sialon and the inner of it α-sialon. According to the observation by SEM, the thickness of modified layer on α-sialon was about 50 μm.

EXAMPLE 4

The β-sialon compact and α-sialon packing powder were prepared at the same way in Example 1.

For the thickness increment of modified surface layer, it was maintained at 1600° C. for three hours prior to sintering it at 1750° C. for one hour under nitrogen atmosphere.

Then the thickness of the modified surface layer was measured and the result is shown at Table 3.

TABLE 3

The thickness variation of the modified surface layer
with preheat treatment time

| Heat-treatment time at 1600° C. prior to sintering | Thickness increment of modified surface of β-sialon layer on α-sialon |
|---|---|
| 0 hour | 50 |
| 3 hour | 200 |

EXAMPLE 5

The sample was prepared in same way as in Example 1. The β-sialon compact packed by α-sialon packing powder was preheated at 1600° C. for three hours and then sintered at 1750° C. for one hour under nitrogen atmosphere.

The cross section and the surface of the sintered body were finely polished down to 1 μm. Then Vicker's hardness was measured by indentation method.

The Vicker's hardness of cross section of the sintered body which composed of β-sialon is 1700 kg/mm$^2$ but that of the modified surface which composed of α-sialon phase is higher at 2100 kg/mm$^2$.

EXAMPLE 6

The sample was prepared in the same way as in Example 1. The β-sialon compact packed by α-sialon packing powder was preheated at 1600° C. for three hours and then sintered at 1750° C. for one hour under nitrogen atmosphere.

Figure 2:
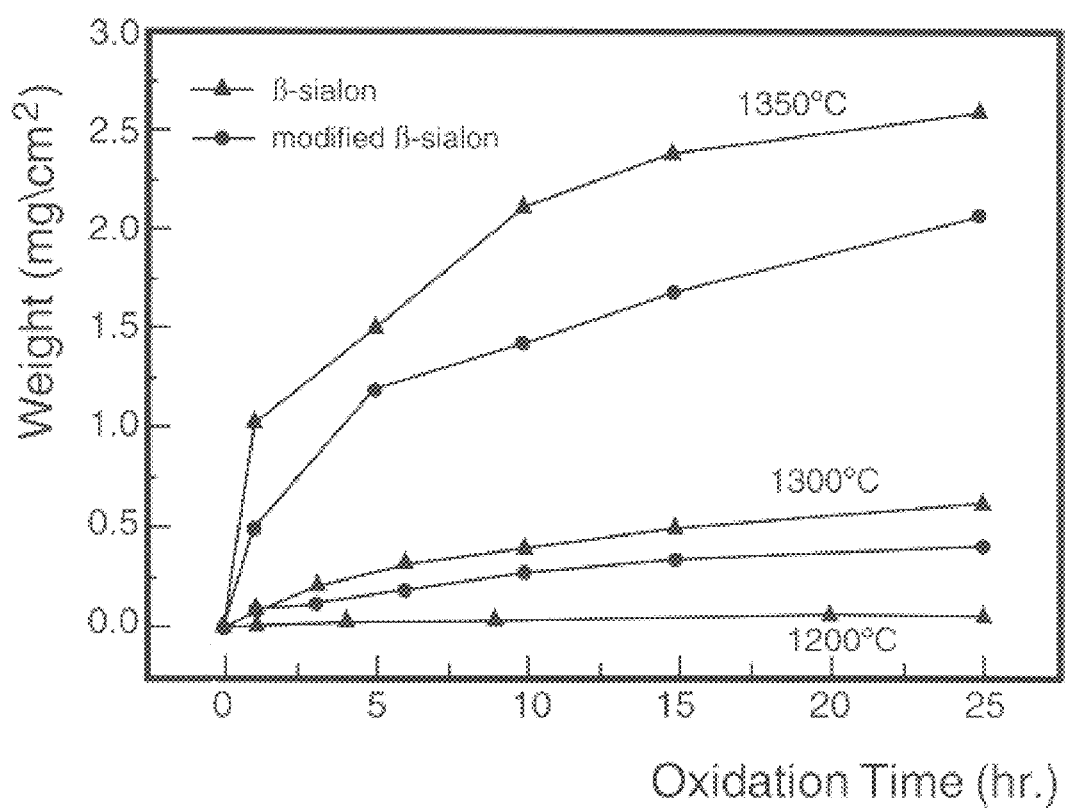
FIG. 2 shows the weight gain of each sialon composite with oxidation time at 1200° C., 1300° C. and 1350° C.

The surface of the sintered body was finely polished down to 1 μm and then the weight gain for the oxidation resistance were measured at 1200° C., 1300° C. and 1350° C. for up to 25 hours. The results are shown at FIG. 2 wherein the surface modified β-sialon shows the better oxidation resistance, that is, less weight gain than not-surface modified β-sialon.

EXAMPLE 7

The sample was prepared int he same way as in Example 1. The β-sialon compacts packed by α-sialon packing powder were preheated at 1600° C. for three and six hours, and then sintered at 1750° C. for one hour under nitrogen atmosphere.

For the comparison, the β-sialon compact packed by BN powder was preheated at 1600° C. for three hour and then sintered at 1750° C. for one hour.

All the prepared samples were finely polished down to 1 μm for the measure of wear resistance. An alumina ball was put on the polished samples and rotated at 100 r.p.m (it's linear velocity, 0.04 m/sec) while vertically imposing 280N onto the sample surface. A turpentine oil was employed as a lubricant. A diameter of wear scar that appears on the sample depending on an elapsed time was measured and the wear-resistance was estimated accordingly. At this time, the diameter of the alumina ball was 12.7 mm, the surface hardness of it was less than 0.05 μm. The measured variations of the wear-scar diameter with regard to the thickness of modified surface layer are shown in table 4.

Accordingly, it is understood that the smaller is the measured diameter of wear scar, the better the wear resistant property.

TABLE 4

The wear resistance of surface modified sialon

| | The diameter of wear scar (μm) | |
|---|---|---|
| | after 1.5 hour | after 4 hour |
| mol-surface-modified β-sialon | 596 | 772 |
| surface-modified β-sialon (3 hour preheat treatment) | 524 | 694 |
| surface-modified β-sialon (3 hour preheat treatment) | 508 | 653 |

The sialon according to the present invention enhances the hardness, oxidation resistance, and flexural strength while maximally maintaining its own bulk property to a user's requirements. Further, the deterioration of the physical properties with regard to the entire bulk of the sintered body is prevented, for thereby realizing the excellent properties that are attributed to the two phases.

Also, in the fabrication method of the present invention, the compact is sintered with just packed by the appropriate phase composition without any a complicated or novel process thereto, for thereby easily fabrication the sialon surface modified sialon in a desirable way.

What is claimed is:

1. A method of modifying a surface of a β-sialon ceramic, wherein a compact of β-sialon composition has a formula $Si_{6-z}Al_zO_zN_{8-z}$, where $0<z\leq 4.2$, comprising:
    packing the β-sialon compact with a powder mixture of α-sialon having a formula $M_pSi_{12-(m+n)}Al_{(m+n)}O_nN_{16-n}$, where $0<p\leq 2.0$, $0<m\leq 2.5 \geq 0<n<2.0$ and m is a metal;
    preheating the resultant packed compact; and
    sintering the packed compact at a temperature higher than the temperature of the preheat treatment, wherein the resulting 0-sialon surface has a thickness above 50 μm and below 200 μm.

2. The method of claim 1, wherein the packed compact is preheated at a temperature between 1100° C. and 1700° C.

3. The method of claim 1, wherein the packed compact is preheated for up to 3 hours.

4. The method of claim 1, wherein the sintering temperature is between 1400° C. and 1900° C.

5. The method of claim 1, wherein the packed compact is sintered for up to 2 hours.

6. The method of claim 1, wherein the sintering is in a nitrogen or nitride atmosphere.

7. The method of claim 1, wherein the β-sialon compact can optionally contain an additive selected from the group consisting of $Y_2O_3$, $Al_2O_3$, AlN, $CeO_2$, $Nd_2O_3$, $Sm_2O_3$, $Er_2O_3$, $Yb_2O_3$, $Dy_2O_3$, $Gd_2O_3$, and a mixture thereof to enhance densification.

8. The method of claim 1, wherein M is a member selected from the group consisting of Li, Mg, Ca, Y, Er, Nd, Gd, Dy, Na, Ce, Sm and Be.

9. A method of modifying a surface of an α-sialon ceramic, wherein a compact of α-sialon composition has a formula $M_pSi_{12-(m+n)}Al_{(m+n)}O_nN_{16-n}$, where $0<p\leq 2.0$, $0<m\leq 2.5$, $0<n<2.0$ and m is a metal, comprising:
    packing the α-sialon compact with a mixture of β-sialon composition having a formula $Si_{6-z}Al_zO_zN_{8-z}$, where $0<z\leq 4.2$;
    preheating the resultant packed compact; and
    sintering the packed compact at a temperature higher than the preheat treating temperature.

10. The method of claim 9, wherein the packed compact is preheated at a temperature between 1100° C. and 1700° C.

11. The method of claim 9, wherein the packed compact is preheated for up to 3 hours.

12. The method of claim 9, wherein the sintering temperature is between 1400° C. and 1900° C.

13. The method of claim 9, wherein the packed compact is sintered for up to 2 hours.

14. The method of claim 9, wherein the sintering is in a nitrogen or nitride atmosphere.

15. The method of claim 9, wherein the β-sialon compact can optionally contain an additive selected from the group consisting of $Y_2O_3$, $Al_2O_3$, AlN, $CeO_2$, $Nd_2O_3$, $Sm_2O_3$, $Er_2O_3$, $Yb_2O_3$, $Dy_2O_3$, $Gd_2$, $O_3$ and a mixture thereof to enhance densification.

16. The method of claim 9, wherein M is a member selected from the group consisting of Li, Mg, Ca, Y, Er, Nd, Gd, Dy, Na, Ce, Sm, and Be.

* * * * *